July 24, 1956   F. H. HUSMAN   2,756,081
STUFFING BOXES FOR ROTATABLE MEMBERS
Filed Dec. 10, 1953
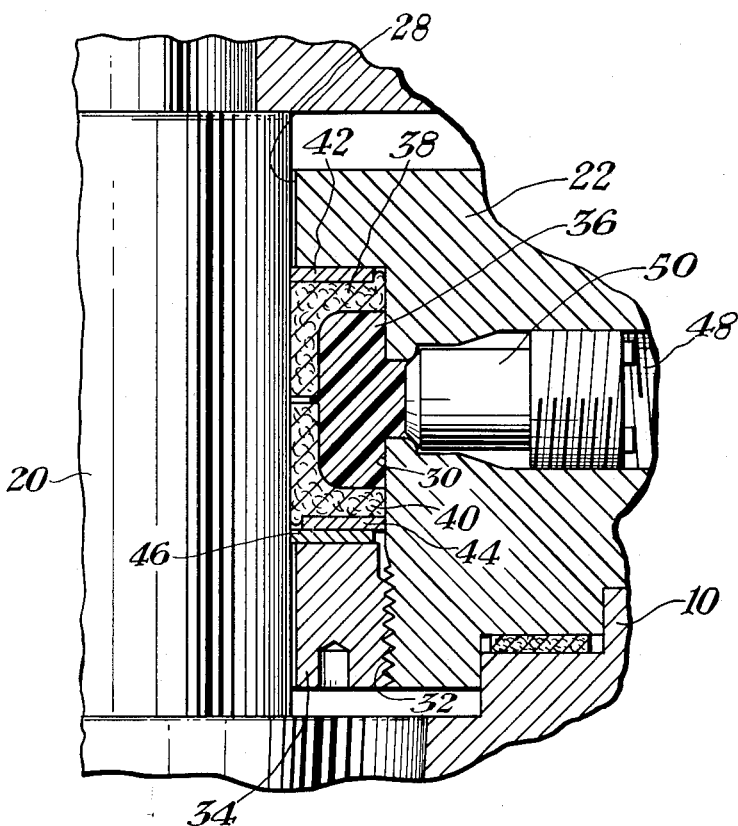
INVENTOR.
Fred H. Husman.
BY
HIS   ATTORNEY

United States Patent Office 2,756,081
Patented July 24, 1956

2,756,081

STUFFING BOXES FOR ROTATABLE MEMBERS

Fred H. Husman, Kewanee, Ill., assignor to Walworth Company, Boston, Mass., a corporation of Massachusetts Application December 10, 1953, Serial No. 397,291

2 Claims. (Cl. 286—38)

This invention relates to stuffing boxes and more particularly to stuffing boxes for rotatable members or stems. While it is intended primarily for use on valves, and is equally useful in gate valves, globe valves, angle valves and lubricated or non-lubricated plug valves, its use is not restricted to valves and it may be used in any application where a stuffing box finds utility.

It is customary to prevent leakage along a rotatable stem by utilizing a plastic packing composition forced under pressure into a confined space surrounding the stem with which a seal is to be effected. The plastic packing engages packing rings to force the same into sealing engagement with the stem and adjacent stationary structure, such as a gland. When the packing rings are formed of flowable material such as a synthetic plastic, they have a tendency to be extruded along the stem or into the gland under the pressure of the plastic packing composition. Metallic rings have been located adjacent the packing rings to reduce such extrusion but it has been impossible to maintain, between the sealing ring and the stem as well as between the sealing ring and the casing bonnet, clearances small enough to be effective. If such clearances are small enough to prevent extrusion of the packing rings, any eccentricity of the stem will cause the sealing ring to bind or jam in the bonnet. It is an object of this invention to limit extrusion of packing rings along the stem as well as to prevent binding of the stem regardless of eccetricity of the same relative to the bonnet.

Another object is to simplify the assembly of a stuffing box in a casing bonnet.

Another object is to utilize, in a packing, a pair of sealing rings between a packing ring and a gland to limit extrusion of the packing ring, one of the sealing rings having a relatively close fit between the internal diameter thereof and the stem with a relatively loose fit between the outer diameter thereof and the bonnet wall, the other of the pair of sealing rings having a relatively close fit between the outer diameter thereof and the bonnet wall with a relatively loose fit between the inner diameter thereof and the stem.

Other objects and advantages will appear from the following description taken in connection with the accompanying drawing which is a fragmentary sectional view of a stuffing box embodying the invention:

Referring more particularly to the drawing, the invention is shown as embodied in a casing 10 having a rotatable stem 20 extending externally of the casing 10 through a bore 28 formed in a bonnet 22 which is carried on the casing 10.

The bonnet 22 is counterbored at 30 and 32 and threaded into the counterbore 32 is an annular gland 34. The inner diameter of the annular gland 34 is substantially equal to the diameter of the bore 28 so that the gland 34 cooperates with the walls of the counterbore 30 to define an annular recess 36 adjacent the stem 20.

An annular sealing unit is disposed within the recess 36 and is comprised of a pair of juxtaposed flexible packing rings 38, 40. The packing rings 38, 40 are generally L-shaped in cross-section, each being comprised of an axially extending flange and a radially extending flange. The axial flange of each ring engages the stem 20 and extends toward the corresponding axial flange of the other ring.

The radially extending flanges of the packing rings 38, 40 respectively engage a pair of flat sealing rings 42, 44. The sealing rings 42, 44 are formed of a relatively nonyielding material, such as steel. The inner diameter of the sealing ring 42 is selected to provide a minimum clearance between the inner peripheral wall of the ring 42 and the surface of the stem 20, while the outer diameter of the ring 42 is selected to provide substantial clearance between the outer periphery of the ring 42 and the annular wall of the recess 36. On the other hand, the inner diameter of the ring 44 is selected to provide substantial clearance between the inner peripheral wall of the ring 44 and the surface of the stem 20, while the outer diameter of the ring 44 is selected to provide a minimum clearance between the outer peripheral wall thereof and the cylindrical wall of the recess 36.

Positioned between the sealing ring 44 and the gland 34 is a third sealing ring 46 of relatively unyielding material, such as steel or the like. The inner diameter of the ring 46 is selected to provide a minimum clearance between the inner peripheral wall of the ring 46 and the surface of the stem 20, while the outer diameter is selected to provide substantial clearance between the outer peripheral wall of the ring 46 and the cylindrical wall of the recess 36.

In some instances eccentric movement of the valve stem 20 relative to the wall of the bore 28 in the bonnet 22 may occur and the sealing rings 42, 46 will follow the lateral movements of the stem 20; movement of the sealing rings 42, 46 being permitted by the provision of the substantial clearance between the periphery of the same and the cylindrical wall of the recess 36. However, during such movement, the relationship between the stem 20 and the sealing rings 42, 46 will remain the same with minimum clearance being maintained therebetween. It is also to be noted that as the stem 20 so moves, the sealing ring 44 will remain stationary, being held in position by its close fit with the cylindrical wall of the recess 36.

The chamber 36 is adapted to be filled with a plastic packing composition supplied under pressure through a passage 48 formed in the bonnet 22. The passage 48 communicates with the chamber 36 and contains a suitable check valve fitting 50 which is threaded into the walls thereof.

When the plastic packing composition is admitted to the recess 36 under pressure, the axially extending flanges of the packing rings 38, 40 are forced against the stem 20 and the radially extending flanges thereof are forced against the sealing rings 42, 44. Thus, the pressure of the plastic packing composition within the chamber 36 will exert forces on the packing rings 38, 40 tending to cause the same to flow around the sealing rings 42, 44, 46. However, because of the hereinbefore described spacing between the sealing rings and adjacent structure, extrusion of the packing rings 38, 40 is negligible.

It will be apparent from the foregoing that the illustrated embodiment eliminates excessive extrusion of packing rings from stuffing boxes and obviates the possibility of binding occurring as a result of eccentric movement of the shaft which is sealed. It will also be apparent that the illustrated embodiment of the invention provides a new and improved stuffing box and accordingly accomplishes the objects of the invention. On the other hand, it will be obvious to those skilled in the art that the illustrated embodiment may be variously changed and modified, or features thereof, singly or collectively, embodied in other combinations than that illustrated without departing from the scope of the invention or sacrificing the advantages thereof, and that accordingly the disclosure herein is illustrative only and the invention is not limited thereto.

I claim:

1. A stuffing box for a rotatable member comprising a relatively stationary member having an annular recess adapted to surround the rotatable member and form therewith an enclosed chamber, a pair of juxtaposed packing rings in said chamber adapted for engagement on an inner face thereof with the rotatable member and having an annular recess formed in an outer face thereof, a pair of sealing rings disposed at opposite ends of said chamber between the end walls thereof and said packing rings, one of said sealing rings being adapted to fit closely around the rotatable member and being spaced from the side wall of said chamber, the other said ring being adapted to be spaced from said rotatable member and to fit closely against said side wall, and means for injecting a flowable material into said recess to force said packing rings apart toward said oppositely disposed sealing rings whereby portions of said packing rings tend to flow into said spaces for sealing against leakage from any portion of said chamber without binding due to eccentricities of the rotatable member.

2. A stuffing box as claimed in claim 1 wherein one end wall of the chamber takes the form of an insert portion, and a third sealing ring between said insert portion and said other sealing ring, said third ring being adapted to fit closely around the rotatable member and being spaced from the side wall of the chamber and cooperable with said other sealing ring for sealing said chamber adjacent the rotatable member and said side wall adjacent said insert.

References Cited in the file of this patent
UNITED STATES PATENTS

| | | |
|---|---|---|
| 576,527 | Packer | Feb. 2, 1897 |
| 2,267,183 | Williams | Dec. 23, 1941 |
| 2,273,129 | Messinger | Feb. 17, 1942 |
| 2,477,334 | Hibner et al. | July 26, 1949 |